United States Patent [19]

Platt et al.

[11] 4,192,096
[45] Mar. 11, 1980

[54] PLANT CONTAINER FOR GROWING PLANTS WHICH ARE TO BE TRANSPLANTED

[75] Inventors: John R. Platt, Wheaton; William N. Weaver, Northbrook, both of Ill.

[73] Assignee: Illinois Tool Works Inc., Chicago, Ill.

[21] Appl. No.: 882,490

[22] Filed: Mar. 1, 1978

Related U.S. Application Data

[63] Continuation-in-part of Ser. No. 779,446, Mar. 21, 1977, abandoned, which is a continuation-in-part of Ser. No. 741,631, Nov. 15, 1976, abandoned.

[51] Int. Cl.$^2$ ............................................. A01C 11/02
[52] U.S. Cl. ........................................ 47/73; 47/77; 47/86
[58] Field of Search ............... 47/66, 67, 70, 71, 72, 47/73, 74, 75, 76, 77, 78, 84, 85, 86, 87, 81, 48.5; 111/1, 2, 3, 4, 89, 92

[56] References Cited

U.S. PATENT DOCUMENTS

| | | | |
|---|---|---|---|
| 780,118 | 1/1906 | Mosier | 47/66 X |
| 2,120,599 | 6/1938 | Brown | 47/71 |
| 2,380,721 | 7/1945 | Brigden | 47/48.5 |
| 2,758,419 | 8/1956 | Schmitz | 47/73 |
| 2,793,470 | 5/1957 | Hallum | 47/73 |
| 3,142,133 | 7/1964 | Brooks | 47/73 |
| 3,273,284 | 9/1966 | Anagnostou | 47/74 |
| 3,664,062 | 5/1972 | Danielson | 47/87 |
| 3,788,003 | 1/1974 | Creighton et al. | 47/77 X |
| 3,830,015 | 8/1974 | Belgiorno | 47/73 |
| 4,007,761 | 2/1977 | Beckman | 138/103 |
| 4,031,832 | 6/1977 | Edwards | 47/77 X |

FOREIGN PATENT DOCUMENTS

| | | | |
|---|---|---|---|
| 172524 | 9/1952 | Austria | 47/73 |
| 2447250 | 8/1976 | Fed. Rep. of Germany | 47/70 |
| 1561341 | 3/1969 | France | 47/66 |
| 2057500 | 5/1971 | France | 47/47 |
| 2228418 | 12/1974 | France | 47/39 |
| 366735 | 2/1942 | United Kingdom | 47/78 |
| 1267541 | 3/1972 | United Kingdom | 47/67 |

OTHER PUBLICATIONS

Tinus et al. (Ed.) (1974), "Containers in the Rockies and the Plains," by Greffenius, and Container Program in Alberta, by Ferdinand et al. from *Proceedings of the North American Containerized Forest Tree Seedling Symposium,* Gt. Plains, Ag. Coun., Pub. No. 68, pp. 42-52.

*Primary Examiner*—Edgar S. Burr
*Assistant Examiner*—James R. Feyrer
*Attorney, Agent, or Firm*—Thomas W. Buckman; Robert W. Beart

[57] ABSTRACT

A plant container for growing plants to a stage suitable for transplanting. The plant container comprises a base having an imperforate upper surface with a rib upstanding from the upper center of the base and a removable sleeve arrangement that is disposed concentrically about the rib. The lower edge of the sleeve arrangement is disposed on or adjacent to the outer upper peripheral surface of the base to provide drainage openings therebetween. The sleeve arrangement is removable to permit the base and root mass and growing medium of the plant grown in the container and disposed about the rib to be transplanted as a unit. The rib functions to hold the root mass and growing medium of the plant on the base and to permit the container, absent the sleeve, to be handled with a minimum loss of growing medium in normal handling and transplanting operations. In one preferred embodiment, the underside of the base is provided with a depending nose section having a ground penetrating configuration for injection planting of the container absent the sleeve.

In another preferred embodiment, a plurality of integrally interconnected bases are provided in an array of rows and ranks to provide a plurality of integrally interconnected containers for the initial growing of plants in the containers in a greenhouse.

12 Claims, 22 Drawing Figures

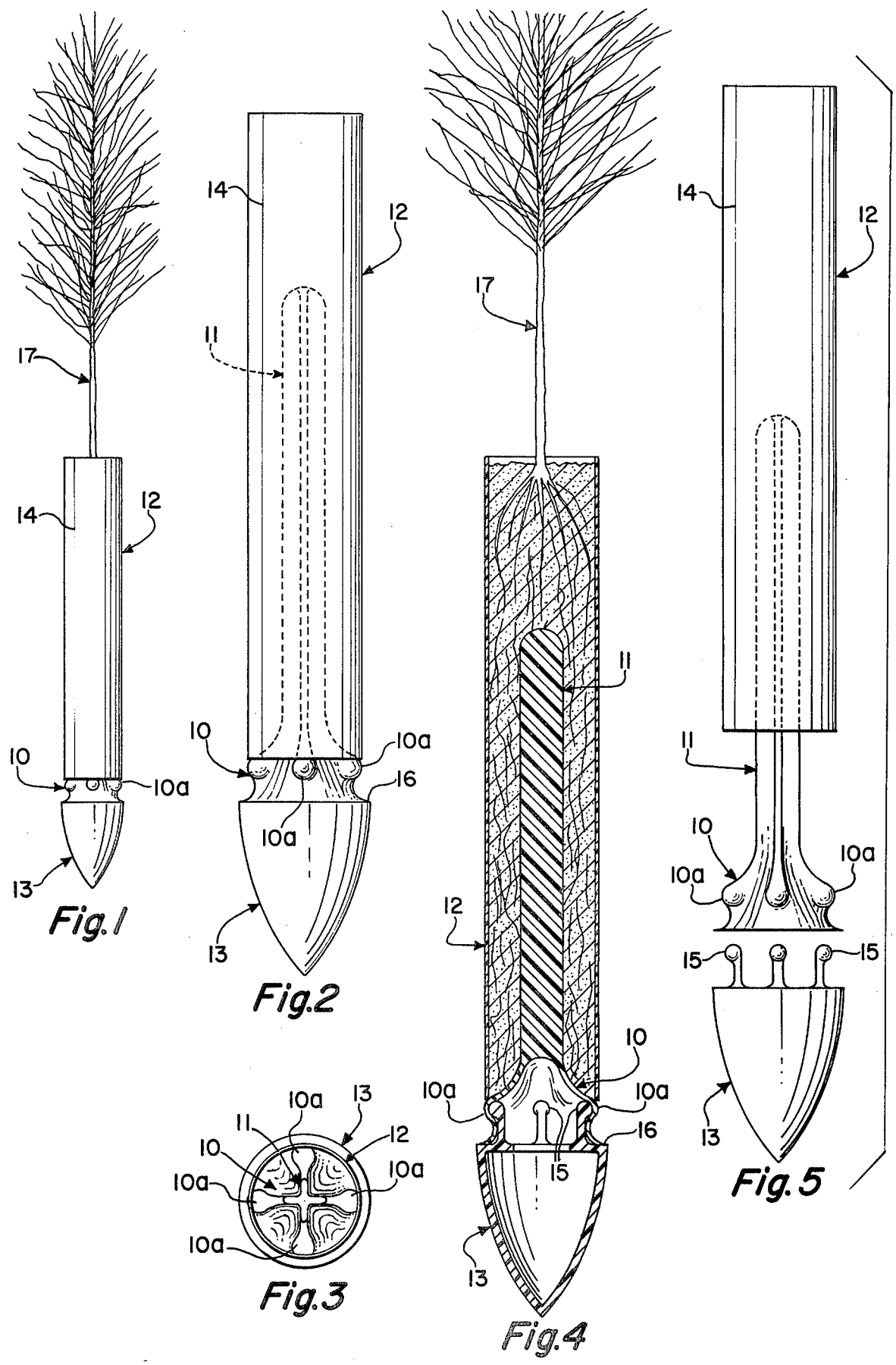

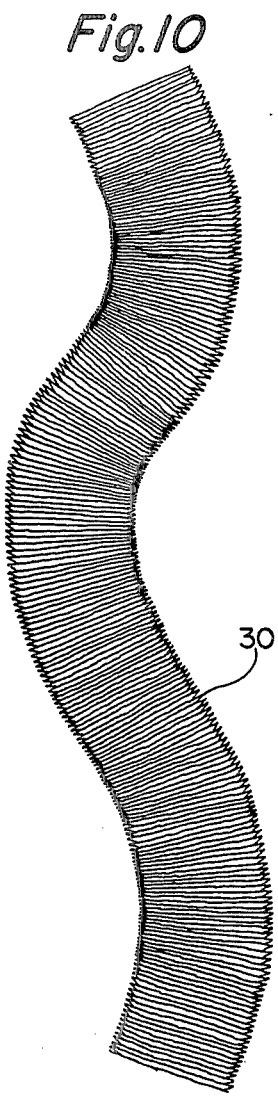
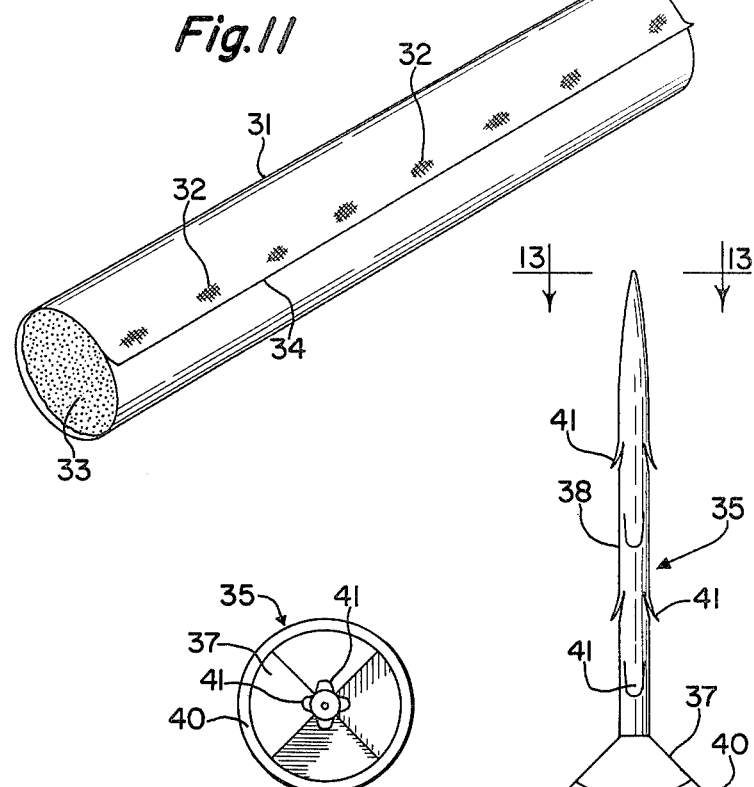
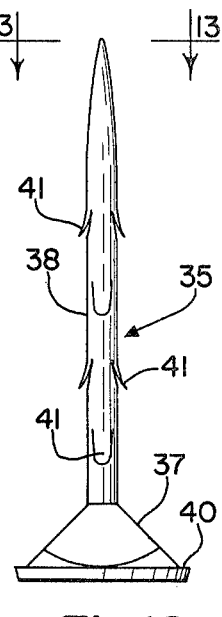
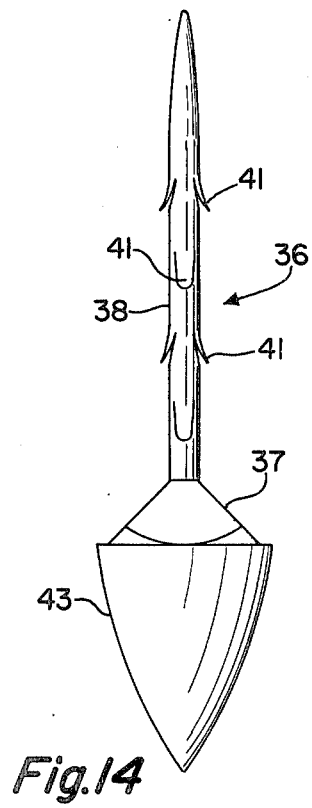
Fig.10 Fig.11 Fig.12 Fig.13 Fig.14

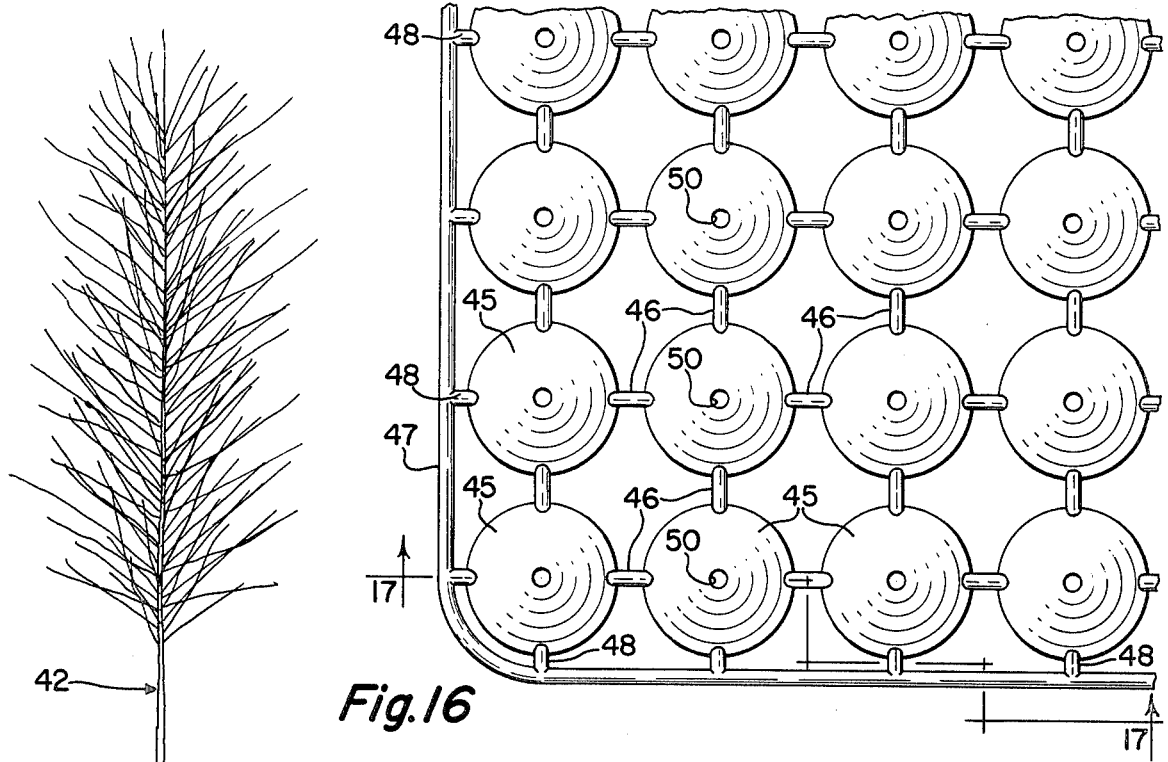
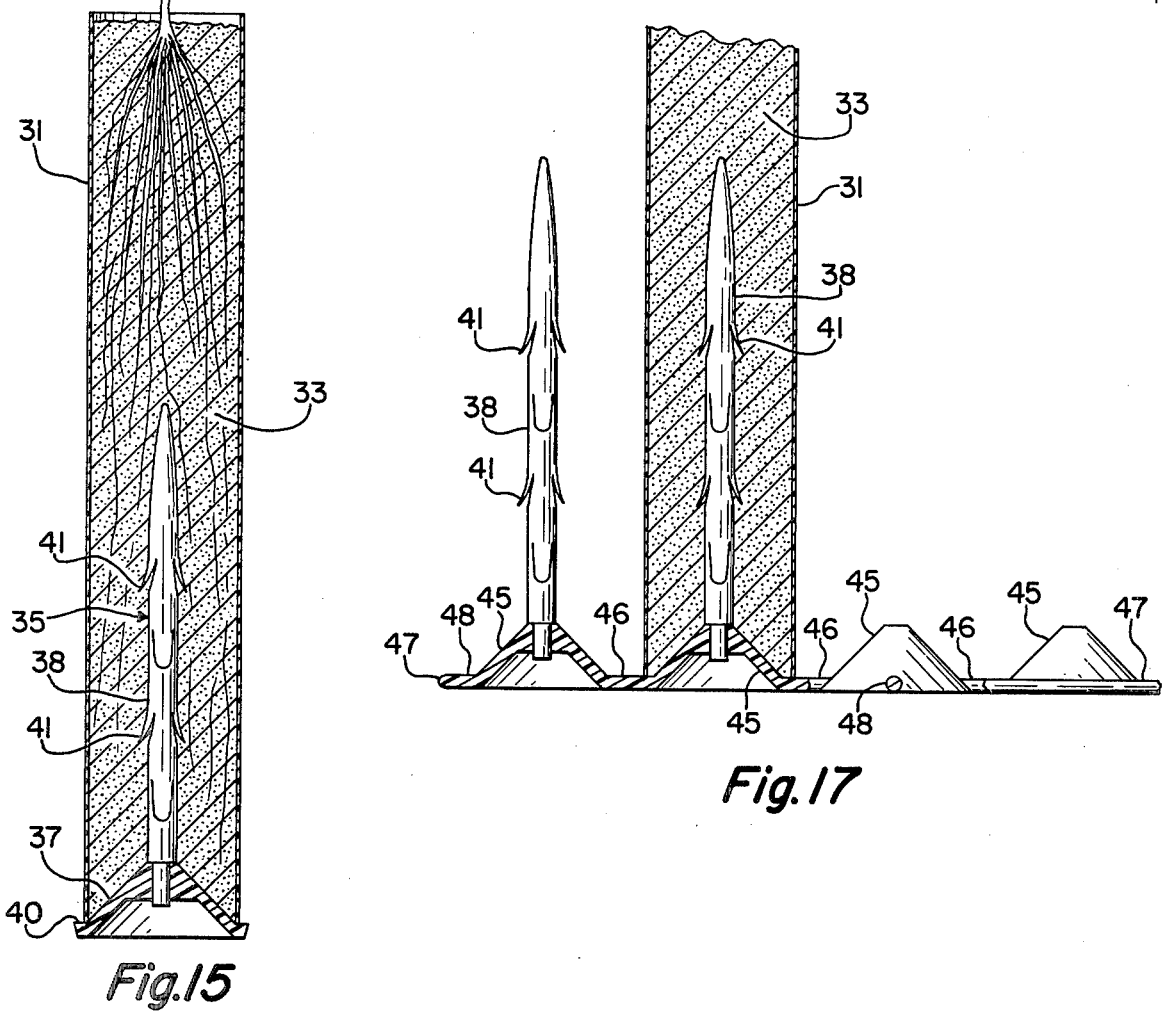

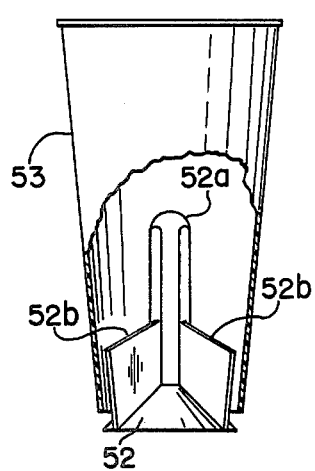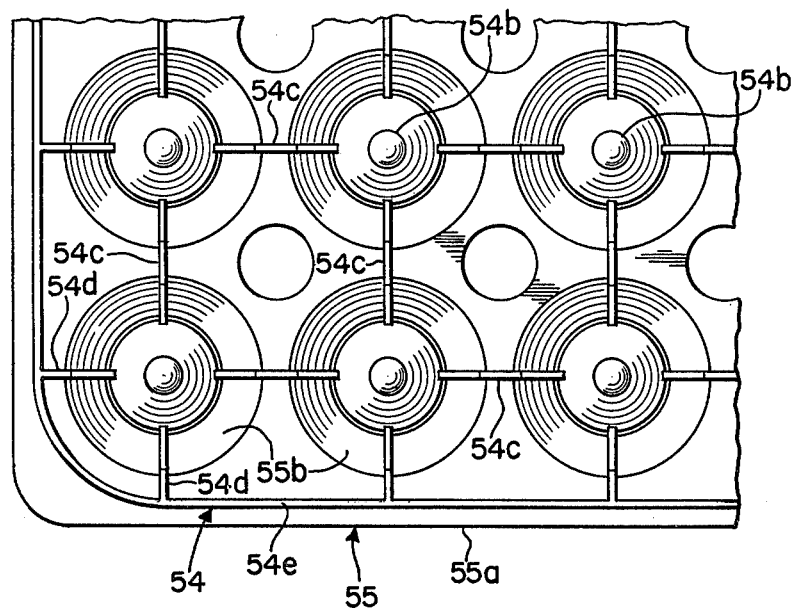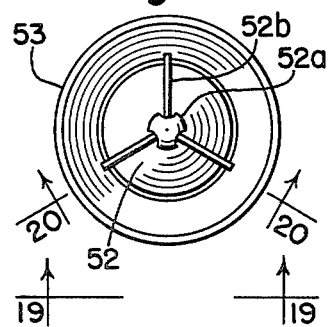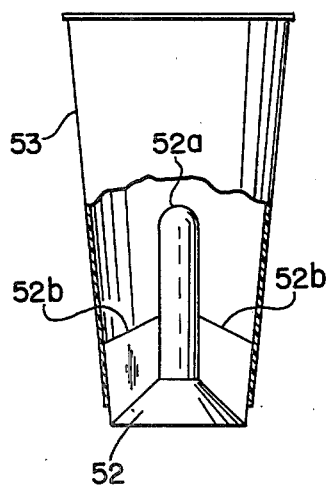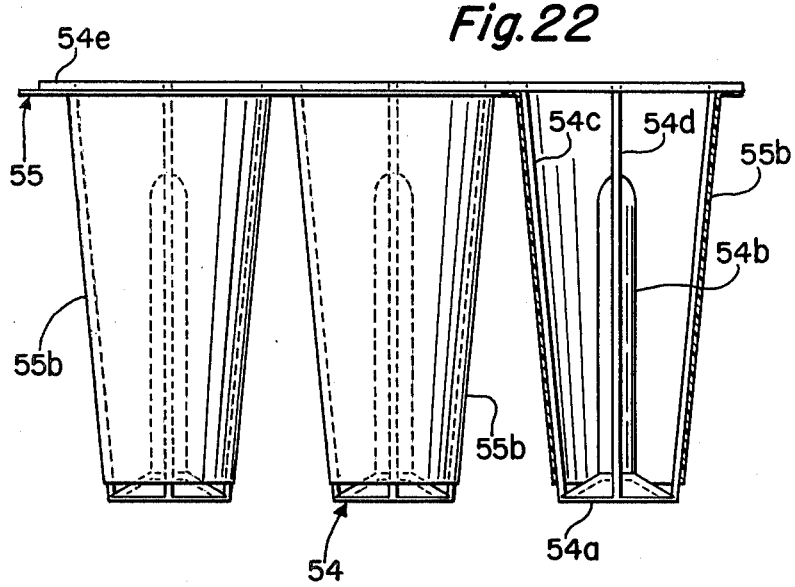

PLANT CONTAINER FOR GROWING PLANTS WHICH ARE TO BE TRANSPLANTED

BACKGROUND OF THE INVENTION

The subject application is a continuation-in-part application of the co-pending application of the same inventors filed Mar. 21, 1977, Ser. No. 779,446, which application is a continuation-in-part application of an application filed Nov. 15, 1976 and carrying the Ser. No. 741,631 both now abandoned.

Plant growth containers for growing a plant to a stage suitable for transplanting are known in many different forms in the prior art. A great number of those containers are similar in function, structure and intended operation to the common clay pot. In a clay pot type of container, the root mass and growing medium of the growing plant are removed from the pot and transplanted in a prepared hole or ground opening. When such pots are made of easily degradable, fragile or porous substances such as peat moss, the entire pot with the plant growing therein is oftentimes placed in the prepared transplanting opening.

Other plant containers for growing plants to be transplanted are known in the art and often comprise a number of elements, some of which are removed and discarded with the remaining elements either aiding in the transplanting operation or used as a partial support for the plant and its growing medium in the transplanting operation. Such containers are, for example, shown in the Bryant Edwards, U.S. Pat. No. 4,031,832. The plant containers of the noted Edwards' patent utilize tubular sleeves that are mounted about and supported on plant frames that comprise upstanding ribs secured to a base section. In addition to supporting the sleeve, the peripheral ribs of the noted Edwards' patent serve to support and contain the root mass and growing medium of the plant therebetween. After the frames of the container of the Edwards' patent have been planted with the growing medium and plant growing therein, the plant roots grow out of the frame between the ribs. Such arrangements are satisfactory where the planted ribs do not interfere with the future healthy growth of the transplanted plant.

SUMMARY OF THE INVENTION

As opposed to the frames of the containers of the noted Edwards' patent, in the subject invention the growing medium and root structure of the plant is supported about a central rib arrangement in the container. Thus, as the plant grows in a container according to the subject invention, the root mass encircles and is captured on the central rib arrangement. Further, in the present invention the sleeve, which in combination with the frame defines the container, is in a basic embodiment initially held in place by the growing medium deposited within the container and about the central rib.

The primary object of the present invention is to provide a plant container for growing a plant to a stage suitable for transplanting in which the container in its initial assembled condition defines a good plant growing container, and in which the outer sidewall of the container can be removed and in which the remaining frame structure will be substantially supportive of the root mass and growing medium of the plant.

A further object of the present invention is to further provide in containers according to the primary object, means on the bottom of the container enabling the container, absent its sidewall, to be injection-planted in a transplanting operation.

Other objects and features of the invention will be apparent upon a perusal of the hereinafter following detailed description read in conjunction with the drawings.

PREFERRED DESCRIPTION OF THE DRAWINGS

FIG. 1 is a side elevational view of a container constructed according to one embodiment of the invention and showing a plant growing therein;

FIG. 2 is an enlarged view of the container of FIG. 1;

FIG. 3 is a top plan view of the container of FIG. 2;

FIG. 4 is a cross-sectional view of the container of FIG. 2 and showing the root structure of a plant growing therein;

FIG. 5 is a view of a partially disassembled view of the container of FIG. 2;

FIG. 10 is another embodiment of the sleeve material of the invention;

FIG. 11 is a perspective view of a sleeve of the invention showing a number of the first steps in the unique method of the invention;

FIG. 12 is a side elevational view of a base member of one embodiment of the invention;

FIG. 13 is a top plan view of a structure shown in FIG. 12;

FIG. 14 is a side elevational view of another embodiment of a base member of the invention;

FIG. 15 is a side elevational view partially in cross section showing the elements of FIGS. 11 and 12 in assembled condition according to the method of the invention and further showing a plant growing in the resulting container;

FIG. 16 is a top plan view of another embodiment of the invention;

FIG. 17 is a side elevational view of the structure shown in FIG. 16 and further showing a complete base assembly and a sleeve with growing medium therein associated with one of the bases;

FIG. 18 is a top plan view of another embodiment of the invention;

FIG. 19 is a side elevational view of the structure shown in FIG. 18 viewed from the line 19—19 of FIG. 18 with the container sleeve in partial cross-section taken on a diameter parallel to line 19—19;

FIG. 20 is a view similar to FIG. 19 but taken substantially along the line 20—20 of FIG. 18;

FIG. 21 is a top plan view of another embodiment of the invention; and

FIG. 22 is a side elevational view of the structure shown in FIG. 21 with the sleeve of one container shown in cross section.

DETAILED DESCRIPTION OF THE PREFERRED EMBODIMENTS

Figure 6:
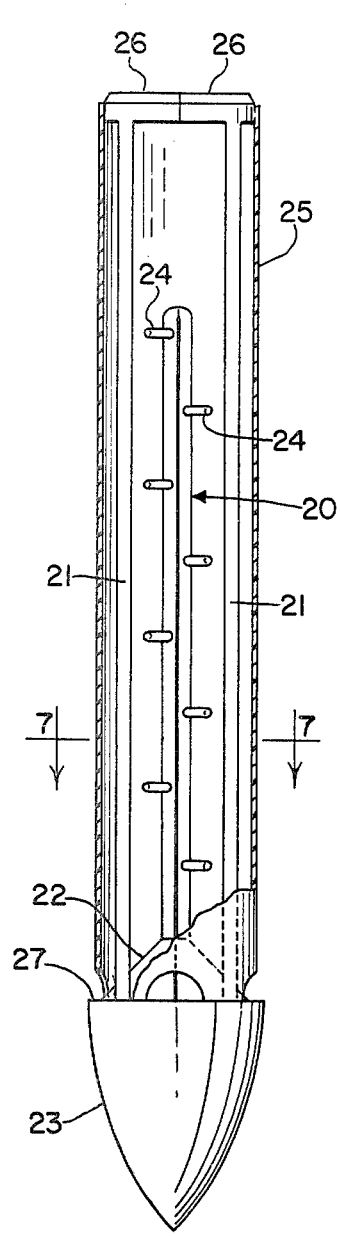
FIG. 6 is a side elevational view of another embodiment of a container made according to the invention and with the outer sleeve member partially cut away.
Figure 7:
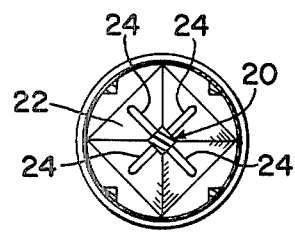
FIG. 7 is a cross-sectional view of the structure shown in FIG. 6 and taken along the line 7—7 of FIG. 6.

In the embodiment of the invention shown in FIGS. 1-5, the basic container comprises a base 10 and an integral rib 11 and a tubular wall member 12 shown in a partially disassembled view in FIG. 5. When the container is to be used in an injection planting system, the nose section 13 is connected to the underside of the base 10. The nose section 13 is formed to have a ground penetrating outer configuration, a shape similar to that of a bullet. Further, if desired or if convenient to manufacture, the base section and nose section may be formed together as a one-piece member. Economically, the base 10, the rib 11, and the nose section 13 may be molded of a plastics material such as polystyrene.

The upper outer surface of the base 10 is domed upwardly to meet the lower end of the rib 11 in smooth curved surfaces. In a preferred embodiment the rib 11 is substantially X-shaped in transverse cross section to provide a minimum of bulk within the container and yet have substantial strength. As may be seen in the drawing, the four radially extending sides of the rib 11 merge at their low ends into curvilinear knobs or bosses 10a formed on the outer upper surface of the base 10.

The knobs or bosses 10a on the base 10 serve to support the lower end of the sleeve 12 on the base 10. As may be seen in the drawing, the four spaces between the bosses 10a and the lower edge of the sleeve 12 are open. Those openings are drainage openings for the complete container.

In a preferred embodiment the sleeve 12 is tubular and substantially cylindrical in shape. The sleeve 12 is preferably formed of a thin material such as bi-axially oriented polystyrene with a wall thickness of 1 to 3 mils. The sleeve 12 is further formed to have an opening or tear line 14 extending longitudinally thereof. The tear line 14 may be formed by any suitable known arrangement. For example, the tear line 14 may be a perforated line with a tear tab at one end of the sleeve, or the sleeve in an initial sheet condition may have two longitudinal edges shaped and sealed such that the outer lapped edge may be grasped and pulled to open the sleeve along one longitudinal side thereof. Further, as an example, the sleeve 12 may be formed into a tube from sheet material with two opposite edges being brought together and held together by an easily removable tape strip. Important in any means provided for removing the sleeve is that the sleeve 12 should remain secure as the outer sidewall of the defined container during the growth of a plant therein to the transplanting stage, and when the plant is ready for transplanting the sleeve 12 should be easily operable and removable with a minimum of disturbance to the growing medium and root mass of the plant that has been grown in the container.

In making the sleeve 12, if the material of the sleeve is extremely thin it may be desirable to fold a cuff or otherwise reinforce the lower end of the sleeve to substantially maintain its circular shape as the lower edge of the sleeve rests upon the four bosses 10a of the base 10.

With the base 10 formed as shown and described, the upper surface of the nose section 13 may conveniently be provided with four short posts 15 shaped to be snap-fitted within the hollow underside of the base 10 and substantially as shown in the cross-sectional view of FIG. 4.

If the container absent the sleeve 12 is to be injection-planted with a tubular tool such as shown in the above-noted Edwards' patent, the lower radially outward periphery of the base 10 or the upper radially outward edge of the nose section 13 should be provided with an annular shoulder such as shoulder 16. The shoulder 16 has an outer diameter preferably slightly greater than the outer diameter of the tubular planting tool intended to be used in the injection planting operation. Also, the inner diameter of the shoulder 16 should be greater than the maximum outer diameter of the base 10 and less than the inner diameter of the tubular planting tool. That arrangement, as noted in the Edwards' patent permits the container absent its sleeve to be telescopically mounted in the tubular planting tool with the growing medium and root mass of the plant within the tubular planting tool and with the lower edge of the planting tool in vertical abutment on the annular shoulder 16.

FIG. 4 in its cross-sectional view shows how a plant 17 which may for example be a conifer seedling, will grow in the defined container of FIGS. 1-5. The growing medium for the plant 17 fills the area within the sleeve 12 and about the rib 11. The root mass of the seedling 17 will grow downwardly throughout the growing medium and circumferentially about the rib 11 to the drainage openings at the lower end of the container. Any roots reaching the drainage openings are generally air pruned thereat. When the sleeve 12 is removed contemporaneously with the transplanting of the seedling 17, the rib 11 will tend to hold the growing medium and root means of the seedling on the base 10. Conveniently, the container absent its sleeve is held by grasping the base 10 and it can be seen that by virtue of the defined arrangement the seedling can be normally handled in the transplanting operation with the root mass and a substantial amount of the growing medium being together as a unit. If the soil at the transplanting site is relatively soft, or if a suitable opening has been prepared by a dibble, the container absent the sleeve 12 and with the seedling in its growing medium retained on and about the rib 11 may be inserted or pushed into the soil of the transplanting site. If the container absent its sleeve is to be transplanted by an injection planting system, the embodiment of the container including the nose section 13 is preferred to aid in the injection process of the container absent its sleeve.

It should be understood that the relative lengths and diameters of the various elements of the embodiment shown in FIGS. 1-5 are only one example of a container constructed according to the invention. Preferably the rib 11 should extend through most of the length of the sleeve 12, and the point of termination of the rib 11 at its upper end should be determined by the type of plant to be grown in the container so that the upper end of the rib 11 does not interfere with the normal growth of the root mass of the selected plant.

In a greenhouse, substantial numbers of the containers of the subject invention absent the nose section 13 may be placed on open wire racks for convenient growing of a large number of the plants. If the containers are made in an embodiment including the nose section 13, the greenhouse may be provided with racks or trays having tapered holes capable of receiving the nose sections 13 therein and holding the containers in an upright condition.

The embodiment of FIGS. 6-9 is substantially the same in function, basic structure, operation and result to the container embodiment of FIGS. 1-5. The embodiment of FIGS. 6–9 primarily differs in having a differently shaped central rib 20 and in further being provided with removable peripheral ribs 21. In the embodiment of FIGS. 6–9 the base 22 and the nose section 23 are integrally interconnected. The upper surface of the base 22 is formed in a pyramidal shape such as that of a four-sided pyramid. The lower end of the rib 20 is integrally connected to the apex of the outer pyramidal surface of the base 22 to upstand therefrom.

The rib 20 is formed to have a plurality of integral protuberances or pins 24 extending transversely outwardly thereof as may be seen in the drawing. The protuberances 24 are further positioned in spaced-apart relationships to each other longitudinally of the rib 20 and at different radial positions circumferentially thereabout. The protuberances 24 in combination with the rib 20 tend to intermesh or interlock with the root mass of the plant 17 growing therein so that as the container absent its sleeve 25 is normally handled, substantial containment or retention of the root mass and growing medium of the plant thereabout will result.

Figure 8:
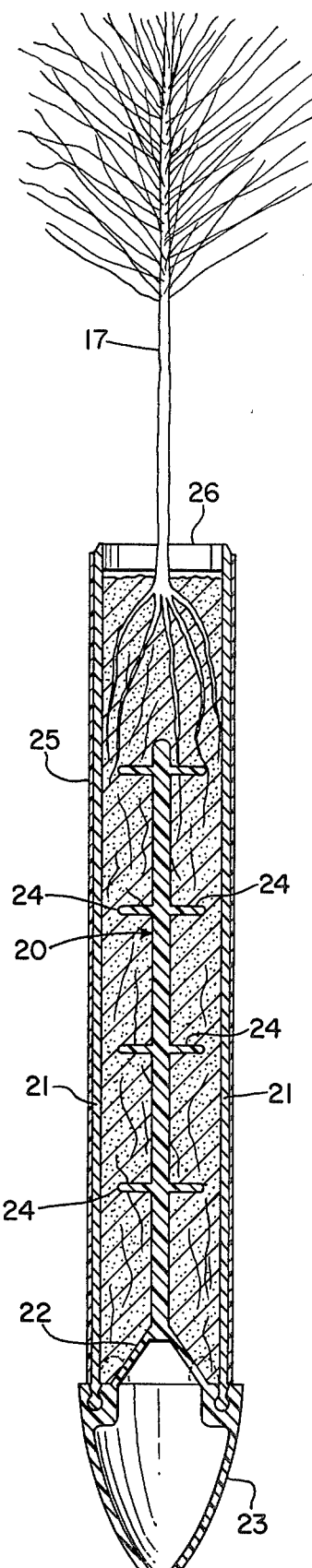
FIG. 8 is a cross-sectional view of the plant container shown in FIG. 6 and further showing a plant growing therein.
Figure 9:
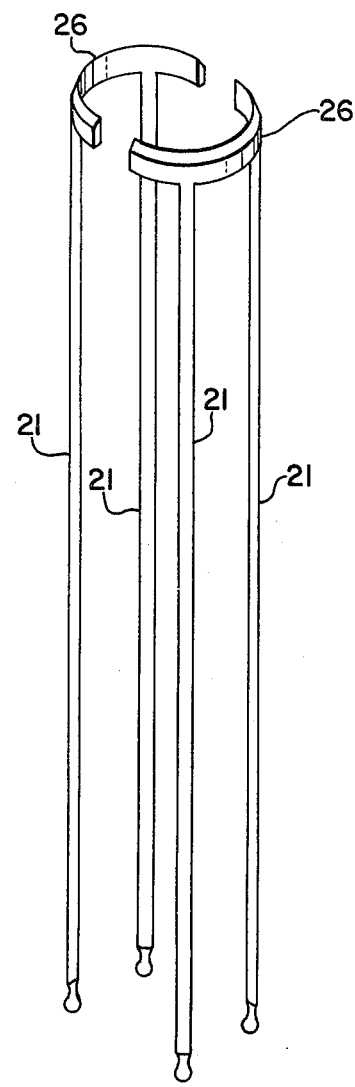
FIG. 9 is a isometric view of the outer sleeve supporting ribs of the container of FIGS. 6–8.

In the embodiment of FIGS. 6–9 four removable ribs 21 are provided. Although other known constructions may be used, one contemplated construction for the ribs 21 is to provide the lower ends of the ribs 21 with ball-shaped ends which may be snap-fitted into complementary shaped pockets or sockets in the upper peripheral surface of the nose section 23. Further, the invention contemplates that the upper ends of two ribs 21 may be integrally molded with one-half of a ring 26 such as shown in FIG. 9. When the four ribs 21 are assembled on the nose section 23 circumferentially about the base 22, the two ring halves 26 will abut each other to define a complete ring. With the four ribs 21, the sleeve 25 may be made of an extremely thin flexible material, since the four ribs 21 will support the sleeve as shown in FIGS. 6 and 8 to define the complete container. The sleeve 25 if formed of a shrink film plastics material, may be partially heat shrunk about the ribs 21 or ring halves 26 to hold the sleeve 25 and ribs 21 together. Further, the invention contemplates that if desired the sleeve 25 may be mounted radially inwardly of the ribs 21 and ring halves 26, rather than externally thereof as shown in the drawing.

In any of the described arrangements of the sleeve 25 and the ribs 21, the invention contemplates that contemporaneously with transplanting, the ribs 21 and ring halves 26 will be removed with the sleeve 25 so that the remaining structure is essentially as described relative to the embodiment of FIGS. 1–5. In a removal arrangement for both the ribs 21 and the sleeve 25, the sleeve 25 may be secured to the ribs 21 so that as the sleeve is opened and circumferentially removed from the root mass and growing medium of the plant, the ribs 21 are contemporaneously thereiwth removed. Further, if the sleeve 25 is mounted within the rib cage defined by the ribs 21 and the ring halves 26, the sleeve 25 may comprise four or less longitudinally extending sleeve panels connected longitudinally of the ribs 21 to define a circumferentially complete sleeve.

The lower end of the sleeve 25 is scalloped, preferably as shown in FIG. 6 to define drainage openings in cooperation with the annular shoulder 27 on the upper peripheral portion of the nose section 23. It should be noted that the defined drainage openings of FIG. 6, and also those of the first described embodiment, do not interfere with any roots that may have grown to or partially through the drainage openings because as the sleeve is removed, the roots of the plant are not circumferentially confined or trapped in any part of the sleeve.

As in the first described embodiment, once the sleeve 25, ribs 21, and ring halves 26 have been removed, the growing medium and root mass of the plant 17 held on the rib 20 may be telescopically inserted in a tubular planting tool such as shown in the noted Edwards' patent with the lower edge of the planting tool in vertical abutment on the annular shoulder 27 and by that arrangement the nose section 23 with a plant and its growing medium thereon may be injection-planted in a transplanting operation. Removal of the planting tool leaves the plant 17, the nose section 23, the base 22, and the rib 20 planted in the ground. The roots of the plant 17 may thereafter grow radially outwardly and downwardly into the adjoining ground with substantially no restriction on the future vigorous, healthy growth of the plant by the noted remaining planted container members.

FIG. 10 shows a section of tubing material 30 that may be used in making the sleeves of the various embodiments of the invention and which may also be used in the practice of the method of the invention. The tubing material 30 is a substantially accordian pleated thin plastic material such as may be known in the art of sausage making. Various known types of filling procedures can be used to progressively stretch out the tubular material 30 while contemporaneously filling the extended tubular material 30 with a suitable growing medium. Extended and filled sections of the tubular material 30 may then be sliced therefrom to form a sleeve packed with growing medium somewhat as shown in FIG. 11.

The sleeve 31 in FIG. 11 is made of a thin plastic material, the longitudinal edges of which have been lapped and secured together as by welding at 32 to form a cylindrical sleeve. Further as seen in FIG. 11, the sleeve 31 is filled with a suitable growing medium 33 extending for substantially the full length of the sleeve 31. The welds 34 are such that after a plant has been grown in the completed container and is intended to be transplanted, the sleeve can easily be removed from the growing medium and root mass of the plant by grasping the outwardly extending flap 34, pulling outwardly to break the welds 32 and opening the sleeve 31.

The sleeve 31, as described, is intended, in the method of the invention, to be used with a base such as the base 35 of FIG. 12, or the base 36 of FIG. 14, or with suitable ones of the other base and rib assemblies described in conjunction with FIGS. 1–9.

The base 35 as shown in FIG. 12 comprises a bottom wall portion 37 and a rib member 38. The bottom wall portion 37 and the rib member 38 may be integrally molded from a suitable material such as a polystyrene plastic material or the rib member 38 may be separately formed of a different material than the bottom wall portion 37 and thereafter connected thereto. For example, the bottom wall portion may be molded from polystyrene material and rib member 38 may be made of a cellulose material such as wood. The bottom wall portion 37 as shown in FIGS. 12 and 13 has a generally upwardly domed upper surface formed in one specific embodiment as a four-sided pyramid. The periphery of the bottom wall portion 37 is provided with an annular shoulder 40 extending radially outwardly thereof. In a preferred form, that shoulder is dimensioned to accept a tubular planting tool in vertical abutment thereagainst for injection planting of the base 35 ibn a transplanting operation. The rib member 38 is small enough in transverse dimension so that when it is associated with the sleeve 31, such as shown in FIG. 15, a substantial volume of growing medium remains about the rib member 38 for adequate and proper growth of the roots of the plant through the growing medium and about the rib member 38. The rib member 38 has a length substantially less than the length of the sleeve 31, as may be seen in FIG. 15. The invention contemplates that the rib member 38 may be made of different lengths depending upon the particular plant to be grown in the container. As noted concerning the previously described embodiments, the rib member 38 should have a length great enough to substantially hold the growing medium and root mass of the plant on the bottom wall portion 37 after the plant has grown to the transplanting stage and when the sleeve 31 has been removed. The rib member 38 should be short enough to avoid interference with the node from which the roots grow. The rib member 38 may be provided with tabs or protuberances 41 integrally formed on the rib member 38 to extend downwardly and outwardly from the rib member 38 to permit easy insertion of the rib member 38 into the growing medium 33, but to resist easy withdrawal of the rib member 38 from the growing medium 33. As described relative to the protuberances 24 of the embodiment of FIGS. 6-9, the protuberances 41 are intended to aid in holding the root mass of the plant, growing medium and rib member 38 together when the base 35 is handled in a transplanting operation after the sleeve 31 has been removed. In a preferred embodiment, the upper end of the rib member 38 is tapered to a point substantially as shown in FIG. 12 for easy insertion of the rib member 38 into the growing medium 33 and to provide minimum interference to the roots of the plant as they grow downwardly thereagainst.

In the method of the invention, as base 35 is associated with a sleeve 31 to form a complete plant growing container by projecting the pointed tip of the rib member 38 into the center of the growing medium 38 with the rib member aligned axially of the sleeve 31. The projection of the rib member 38 into the growing medium 33 is continued until the pyramidal sides of the bottom wall portion 37 enter into the end of the sleeve 31 such as shown in FIG. 15. In the assembly of the complete container shown in FIG. 15, it is intended that the lower edge of the sleeve 31 abutting the lower outer margin of the bottom wall portion 37 and within the shoulder 40 not make a water seal therewith. In other words, it is intended that in the complete container, drainage of excess water from the container will occur from between the lower edge of the sleeve 31 and the bottom wall portion 37 of the base 35. As shown in FIG. 15 in cross section, a plant 42 is growing in the defined container with the roots of the plant growing downwardly through the growing medium 33 and about the rib member 38. In the greenhouse growing of such containers they may be conveniently placed to stand on a table or open wire rack in large numbers for convenient care during growing of the plants to the transplanting stage.

The base 36 of FIG. 14 differs from the base 35 of FIG. 12 in that the underside of the bottom wall portion 37 is provided with a depending nose section 43 of a suitable bullet-shaped or ground penetrating configuration. The invention contemplates that the nose section 38 may be integrally molded with the bottom wall portion 37 or may be added thereafter, such as contemplated relative to the described embodiments of FIGS. 1-5. As described relative to the previously described embodiments, the nose section 43 can advantageously aid in the injection planting of the base 36, the growing medium and root mass of the plant grown thereabout when the sleeve 31 has been removed.

FIGS. 16 and 17 show a further embodiment of the invention. A plurality of cone-shaped base sections 45 are integrally molded in a spaced-apart array of parallel rows and ranks. Conveniently, the base sections 45 may be molded by an injection molding process using a suitable plastics material such as polystyrene. FIGS. 16 and 17 show only one corner of the array and it should be understood that the number of rows and ranks may be selected to produce a convenient number of containers for further handling in the growing operations. The base sections 45 are interconnected within the rows and between the ranks by webs 46. The outer periphery of the array conveniently includes a peripheral rail 47 integrally connected to the peripheral base sections 45 by webs 48 to firmly hold the array together, to possibly aid in the molding of the array, and to provide convenient handling means for the array. The top center of the cone of each base section 45 is provided with a hole 50, and as partially shown in FIG. 17, an array of complete bases for a plurality of containers is provided by the insertion of a rib member 38 into each of the holes 50. The ribs 38 may be firmly secured to the base sections 45 by a suitable adhesive, if the particular materials used prevent a secure press-fit.

When all of the base sections 45 are provided with rib members 38, a plurality of sleeves 31 filled with growing medium 33 are inserted over the rib members 38 to form a plurality of complete containers in a unitary assembly for the growing of a plurality of plants to a transplanting stage.

In a greenhouse, the unitary array of containers may be conveniently placed upon an appropriate rack or table surface for easy maintenance of the growing plants.

In some conditions, the webs 46 and 48 may serve to provide accurate alignment of the lower edge of the sleeves 31 relative to the base sections 45 for uniformly defined drainage openings between the lower edges of the sleeves 31 and the base sections 45. The webs 46 and 48 are further intended to be frangible so that when the plants are ready for transplanting, individual containers may be broken from the array, their sleeves 31 may be removed, and each base section 45 with its rib member 38 and the root mass of the plant and growing medium 33 may be handled together as a unit in the further transplanting operation such as described concerning the other embodiments of the invention.

FIGS. 18-20 show a further embodiment of the invention. The container shown therein comprises a base 52 and a sleeve 53. The base 52 is formed at the lower end thereof as a circular member with a domed or cone shaped upper surface. The base 52 further comprises a central upstanding rib member 52a and a plurality of wall members 52b. As may be seen in FIG. 18, the wall members 52b are three in number in a preferred embodiment. The wall members 52b extend radially outwardly of the rib member 52a on the upper surface of the base 52. In a preferred embodiment, the base 52 including the central rib 52a and the wall members 52b may be molded as a one piece unit from a suitable plastics material such as polystyrene. The radially outwardmost edge of the wall members 52b are inclined upwardly and outwardly from the upper surface of the base 52 at an angle substantially corresponding to the angle of inclination of the sidewall of the sleeve 53.

The sleeve 53 is preferably formed of a thin plastics material and is tubular in shape with the upper and lower ends thereof being open. The sidewall of the sleeve 53 is frusto-conical in shape with the sidewall being directed upwardly and outwardly from the lower end thereof. As may be seen in FIGS. 18–20, a container of the subject invention is made by inserting the base 52 into the sleeve 53 from the upper end thereof and moving the base 52 downwardly in the sleeve 53 until the lower circular peripheral edge of the base 52 is moved immediately below the lower edge of the sleeve 53. In that assembled condition of the container, the base 52 is firmly associated with the sleeve 53 with the lower portion of the base 52 defining the bottom wall of the container. As in the previously described embodiments, the container of FIGS. 18–20 may be filled with a suitable growing medium and a seedling may then be grown therein for later transplanting. As the seedling grows in the container, the root mass of the seedling will grow downwardly about the rib member 52a and between the wall members 52b toward the drainage opening defined by the association of the lower periphery of the base 52 with the lower edge of the sleeve 53. In that growing arrangement, the roots of the seedling can grow in a healthy normal manner with air pruning occurring a the defined drainage opening and with an effective entrapment of the root mass and growing medium about the rib 52a, between the wall members 52b on the base 52 so that the base 52 provides an effective arrangement for handling the seedling absent the sleeve 53 in transplanting operations occurring upon completion of the seedlings' growth in the container.

In the arrangement of FIGS. 18–20, it is merely necessary to hold the sleeve 53 and push upwardly on the base 52 from the underside thereof to eject the base 52, the growing medium and root mass of the seedling out of the upper end of the sleeve 53. That operation may be performed by an automatic transplanting machine. As in the previously described embodiments, the seedling is intended to be transplanted with the base 52, and in that condition further healthy growth of the transplanted seedling can occur with substantially no obstruction to that further healthy growth by the planted base 52.

FIGS. 21 and 22 show a further embodiment of the invention, and in that embodiment an integral array of containers is formed by the association of two unitary assemblies. The two unitary assemblies are an integral array of base members 54 and an integral array of sleeves 55. The array of sleeves 55 in a preferred embodiment comprises a thermoformed sheet of a thin plastics material such as polystyrene. The sheet is thermoformed to form a top flat web 55a with a plurality of depending tubular sleeve members 55b. The sleeve members 55b are arranged in the web 55a in a spaced-apart array of parallel rows and ranks with the upper edge of each sleeve member 55b being integral with the web 55a. The sidewall of each sleeve member 55b is frusto-conical in configuration with the sidewall being inclined downwardly and inwardly from the upper edge thereof. The lower end of each sleeve member 55b is open.

The array of base members 54 comprises a plurality of circular bases 54a which are shaped to be upwardly convex. An integral rib member 54b is formed on the central upper surface of each base 54a to upstand therefrom. The array of base members 54 is further preferably made by an ejection molding process using a suitable plastics material to mold a unitary assembly of all of the bases 54a, rib members 54b, with interconnecting inverted generally "U" or "V" shaped webs 54c, with inverted "L" shaped webs 54d and with a peripheral web 54e as may be seen in FIGS. 21 and 22. The webs 54c, d, and e position the bases 54a in substantially the same spaced-apart array of parallel rows and ranks as that of the sleeve members 55b. In the instant embodiment the association and correspondence between the bases 54a, the rib members 54b and the sleeve members 55b is substantially as that described above relative to the container embodiment of FIGS. 18–20. From the foregoing description of the instant embodiment, it may be seen that a large number of containers, such for example 200, may be simply formed by taking the described array of base members 54 and inserting it downwardly into an array of sleeve members 55.

The described plurality of integrally connected containers is intended to be used in a greenhouse operation for growing large numbers of plants to a transplanting stage. After the seedlings have grown to a stage suitable for transplanting, it is merely necessary to hold the array of sleeve members 55 and to apply an upward force on the underside of the bases 54a to eject the bases 54a with the root mass and growing medium of the seedlings growing about and entrapped on the rib members 54b out of the array of sleeve members 55. By any suitable means known in the art, the horizontal cross member of each web member 54c and 54d may be broken to separate the transplants for planting in the ground and for further growth of each plant therein. Those skilled in this art will understand that the embodiment of FIGS. 21 and 22 may be used in relatively high-speed automatic transplanting machines for planting agricultural crops such as tomatoes, peppers, cabbages and lettuce.

Having described the invention, it is to be understood that changes can be made in the described embodiments by a person skilled in the art within the scope of the hereinafter following claims.

We claim:

1. A plant container for growing a plant to a stage suitable for transplanting, said container comprising a base forming the bottom wall of said container and a circumferentially unsupported, discrete sleeve forming the sidewall of said container, said base having a substantially circular periphery and an upper surface being upwardly domed within said periphery which is devoid of any openings capable of passing water therethrough, a rib means for retaining growing medium and root mass thereabout when the sleeve is removed, said rib means located on said upper surface of said base and upstanding therefrom at the apex of the domed surface thereof, said sleeve formed of a thin flexible plastics material in the shape of a tube substantially open at both ends thereof and having an axial extent greater than the axial extent of the rib means, said sleeve disposed concentrically about said rib means with the lower edge of said sleeve cooperating with the base, said base including abutment means adjacent the outer periphery thereof and cooperating with the lower edge of the sleeve to form spaces between the base and the sleeve to permit water to drain from between said periphery and the lower edge of said sleeve, whereby said base absent said sleeve with the growing medium and root mass of a plant grown in said container and about said rib is capable of being transplanted as a unit.

2. In a plant container as defined in claim 1, wherein said rib is substantially X-shaped in transverse cross section.

3. In a plant container as defined in claim 1, wherein said rib is provided with a plurality of transversely outwardly extending protuberances secured to said rib at spaced-apart positions longitudinally and circumferentially of said rib.

4. In a plant container as defined in claim 1, and a growing medium disposed within said sleeve and about said rib.

5. In a plant conainer as defined in claim 1, wherein the underside of said base is formed to have a depending nose section of a bullet shaped configuration.

6. In a plant container as defined in claim 5, wherein the upper end of said nose section is provided with an annular shoulder thereabout capable of receiving a lower edge of a tubular planting tool in vertical abutment thereagainst.

7. In a plant container as defined in claim 5, wherein means is provided on the upper end of said nose section for releasably connecting said nose section to the underside of said base.

8. In a plant container as defined in claim 1, said sleeve being frusto conical in shape with the sidewall thereof inclined downwardly and inwardly, the maximum diameter of said base being no greater than the diameter of the lower open end of said sleeve.

9. In a plant container as defined in claim 8, and a plurality of wall members formed on the upper surface of said base and extending radially outwardly of said rib, each of said wall members having a radially outward edge directed downwardly and inwardly at substantially the same angle of inclination as the sidewall of said sleeve.

10. A plurality of integrally interconnected plant containers for growing a plant in each of said containers to a stage suitable for transplanting, said plurality of plant containers comprising a plurality of base members, each of said base members comprising an upwardly domed surface for forming the bottom wall of a container, a plurality of rib members, each of said rib members connected to substantially the center of said upwardly domed surface of one of said base members to upstand therefrom, web means integrally interconnected to the peripheries of said plurality of base members to maintain said base members in a spaced-apart array of parallel rows and ranks, a plurality of tubular sleeve members integrally interconnected in a spaced-apart array of parallel rows and ranks corresponding to the spaced-apart array of parallel rows and ranks of said plurality of said base members, said web means and said plurality of base members associated with said plurality of tubular sleeve members with each of said base members cooperating with the periphery of one of said tubular sleeve members to form the bottom wall of a container, said web means comprising inverted U-shaped members having legs, the ends of the legs being connected to the peripheries of said base members and associated with said plurality of sleeve members in a superposed relationship therewith the lower edge of said sleeve members spaced from the outer peripheries of the associated bottom walls to permit water to drain therebetween, and said web means being arranged relative to said plurality of tubular sleeve members for separation of said web means and said base members as a unit from said plurality of tubular sleeve members.

11. A plurality of integrally interconnected plant containers as defined in claim 10, said tubular sleeve members being frusto conical in shape with the sidewalls thereof inclined downwardly and inwardly, and the maximum radial extent of said base members being no greater than the radius of the lower open end of said sleeve members.

12. A plurality of integrally interconnected plant containers for growing a plant in each of said containers for growing a plant in each of said containers to a stage suitable for transplanting, said plurality of plant containers comprising a plurality of base members, each of said base members comprising an upwardly domed surface for forming the bottom wall of a container, web means integrally interconnecting said plurality of bases in a spaced-apart array of parallel rows and ranks, a plurality of rib members, each of said rib members connected to substantially the center of said upwardly domed surface of one of said bases to upstand therefrom, a plurality of tubular sleeve members, each of said tubular sleeve members being formed of a material capable of receiving the growing medium for a plant to be grown in said containers packed therein for substantially the longitudinal extent of said tubular sleeve member, each of said rib members being sized sufficiently smaller in transverse dimension to render said rib members capable of being inserted into any growing medium packed within said sleeve members from one end of said sleeve members to hold said sleeve member and base together as a plant container with a volume of growing medium packed in said sleeve and about said rib member sufficient to permit a plant to be grown in each of said containers with the roots of said plant growing through said growing medium and about said rib member, said upwardly domed surface of each of said bases cooperating with sleeve members and growing medium by having means for spacing the lower edge of said sleeve from the periphery of the base therein to permit drainage of water from between said upwardly domed surface of said bases and said lower edge of said sleeve members into which said rib members are projected when said sleeve members are packed with a growing medium and said rib members having been inserted therein with said upwardly domed surface of said bases engaging said growing medium, and means on said sleeve members for opening each of said sleeve members longitudinally thereof to permit removal of said sleeve members from said bases and from the root mass and growing medium of any plants grown in said containers to permit transplanting of each of said bases and the growing medium and root mass of any plant growing in said growing medium and about said rib member of each of said containers, and said web means being frangible to permit intentional separation of said bases from said array.

* * * * *